(12) United States Patent
Milanese et al.

(10) Patent No.: US 10,597,039 B2
(45) Date of Patent: Mar. 24, 2020

(54) METHOD FOR ESTIMATING VARIABLES AFFECTING THE VEHICLE DYNAMICS AND CORRESPONDING VIRTUAL SENSOR

(71) Applicant: Modelway S.r.l., Turin (TO) (IT)

(72) Inventors: Mario Milanese, Turin (IT); Carlo Novara, Turin (IT); Ilario Gerlero, Turin (IT); Mario Bonansone, Turin (IT)

(73) Assignee: Modelway S.r.l., Turin (TO) (IT)

( * ) Notice: Subject to any disclaimer, the term of this patent is extended or adjusted under 35 U.S.C. 154(b) by 0 days.

(21) Appl. No.: 15/501,664

(22) PCT Filed: Aug. 3, 2015

(86) PCT No.: PCT/IB2015/055895
§ 371 (c)(1),
(2) Date: Feb. 3, 2017

(87) PCT Pub. No.: WO2016/020834
PCT Pub. Date: Feb. 11, 2016

(65) Prior Publication Data
US 2017/0225688 A1     Aug. 10, 2017

(30) Foreign Application Priority Data

Aug. 4, 2014     (IT) .............................. TO2014A0631

(51) Int. Cl.
*B60W 40/10*     (2012.01)
*B60W 40/103*     (2012.01)
(Continued)

(52) U.S. Cl.
CPC .......... *B60W 40/103* (2013.01); *B60W 30/02* (2013.01); *B60W 40/068* (2013.01);
(Continued)

(58) Field of Classification Search
CPC .............................................. B60W 10/10–114
See application file for complete search history.

(56) References Cited

U.S. PATENT DOCUMENTS

2010/0131144 A1     5/2010   Ryu et al.

OTHER PUBLICATIONS

Milanese, Mario, Diego Regruto, and Andrea Fortina. "Direct virtual sensor (DVS) design in vehicle sideslip angle estimation." American Control Conference, 2007. ACC'07. IEEE, 2007. (Year: 2007).*

(Continued)

*Primary Examiner* — Genna M Mott
(74) *Attorney, Agent, or Firm* — Nixon & Vanderhye P.C.

(57) ABSTRACT

Method for the estimation of at least a variable ($\beta$; $v_x$, $v_y$; $\psi$, $\mu$) affecting a vehicle dynamics (10), including measuring dynamic variables (MQ) of the vehicle (10) during its motion, calculating in real time an estimate (Formula (I)) of said variable ($\beta$; $v_x$, $v_y$; $\psi$, $\mu$), on the basis of said measured dynamic variables (MQ), The method includes: calculating (230) said estimate of said at least a variable ($\beta$; $v_x$, $v_y$; $\psi$, $\mu$) by an estimation procedure (DVS$_\beta$; DVS$_{\beta v}$, -DVS$_{\beta v \mu}$) comprising taking in account a set of dynamic variables (MQ) measured during the motion of the vehicle (10) over respective time intervals ($n_y$, $n_w$, $n_\psi$, $n_x$, $n_\alpha$) and applying on said set of measured dynamic variables (MQ) at least an optimal nonlinear regression function ($f^*_\beta$; $f^*_x$, $f^*_y$; $f^*_{\beta 1}$, $f^*_{\beta 2}$, $f^*_{\psi 1}$, $f_{\psi 2}$) calculated with respect to said variable ($\beta$; $v_x$, $v_y$; $\psi$, $\mu$) to estimate to obtain said estimate of said variable ($\beta$; $v_x$, $v_y$; $\psi$, $\mu$), said optimal non linear regression function ($f^*_\beta$; $f^*_x$, $f^*_y$; $f^*_{\beta 1}$, $f^*_{\beta 2}$, $f^*_{\psi 1}$, $f^*_{\psi 2}$) being obtained by an optimal calculation procedure (220) including: on the basis of an acquired set of reference data (D$_d$) and of said set of dynamic variables (MQ) measured during the motion of the vehicle (10), finding, for a desired accuracy level ($\epsilon$), a regression function ($f^*_\beta$; $f^*_x$, $f^*_y$; $f^*_{\beta 1}$, $f^*_{\beta 2}$, (Continued)

$f^*_{\psi 1}$, $f^*_{\psi 2}$) giving an estimation error lower or equal than said desired accuracy level ($\varepsilon$) in a given set of operative conditions (OC), said acquired set of reference data ($D_d$) being obtained by acquiring (210) in said given set of operative conditions (OC) a set of reference data ($D_d$) of variables including variables corresponding to said measured dynamic variables (MQ) of the vehicle (10) and a lateral ($v_y$) and a longitudinal velocity ($v_x$) of the vehicle (10).

16 Claims, 2 Drawing Sheets

(51) Int. Cl.
| | | |
|---|---|---|
| *B60W 40/114* | (2012.01) | |
| *B60W 40/068* | (2012.01) | |
| *B60W 30/02* | (2012.01) | |
| *B60W 50/00* | (2006.01) | |

(52) U.S. Cl.
CPC .......... *B60W 40/10* (2013.01); *B60W 40/114* (2013.01); *B60W 2050/0031* (2013.01); *B60W 2520/10* (2013.01); *B60W 2520/105* (2013.01); *B60W 2520/12* (2013.01); *B60W 2520/125* (2013.01); *B60W 2520/28* (2013.01); *B60W 2540/18* (2013.01)

(56) References Cited

OTHER PUBLICATIONS

Borodani, P. "Virtual sensors: An original approach for dynamic variables estimation in automotive control systems." Proc. Int. Symposium on Advanced Vehicle Control, Kobe, Japan. 2008. (Year: 2008).*

Canale, Massimo, et al. "A study on the use of virtual sensors in vehicle control." Decision and Control, 2008. CDC 2008. 47th IEEE Conference on. IEEE, 2008. (Year: 2008).*

Milanese, Mario, et al. "DVS: a new technology for substituting real sensors with Virtual Sensors." Vehicle Dynamics Expo, Stuttgart, Jun. 12, 2012 (Year: 2012).*

C. Novara, F. Ruiz and M. Milanese, "Direct Filtering: A New Approach to Optimal Filter Design for Nonlinear Systems," in IEEE Transactions on Automatic Control, vol. 58, No. 1, pp. 86-99, Jan. 2013. (Year: 2013).*

L. H. Zhao, Z. Y. Liu and H. Chen, "Design of a Nonlinear Observer for Vehicle Velocity Estimation and Experiments," in IEEE Transactions on Control Systems Technology, vol. 19, No. 3, pp. 664-672, May 2011. (Year: 2011).*

J. L. Coyte, B. Li, H. Du, W. Li, D. Stirling and M. Ros, "Decision tree assisted EKF for vehicle slip angle estimation using inertial motion sensors," 2014 International Joint Conference on Neural Networks (IJCNN), Beijing, 2014, pp. 940-946. (Year: 2014).*

International Search Report and Written Opinion of the ISA for PCT/IB2015/055895, dated Jan. 18, 2016, 14 pages.

Milanese et al., "Direct Virtual Sensor (DVS) design in vehicle sideslip angle estimation", American Control Conference, 2007, ACC '07, IEEE, Jul. 9, 2007, pp. 3654-3658.

Borodani et al., Virtual Sensors: an Original Approach for Dynamic Variables Estimation in Automotive Control Systems, 9th International Symposium on Advanced Vehicle Control—AVEC '08, Oct. 9, 2008.

Canale et al., "A study on the use of virtual sensors in vehicle control", Decision and Control, 2008. CDC 2008. 47th IEEE Conference on, IEEE, Dec. 9, 2008, pp. 4402-4407.

Milanese et al., "DVS : a new technology for substituting real sensors with Virtual Sensors", Vehicle Dynamics Expo, Jun. 12, 2012.

Novara et al., "Direct Filtering: A New Approach to Optimal Filter Design for Nonlinear Systems", IEEE Transactions on Automatic Control, vol. 58, No. 1, Jan. 1, 2013, pp. 86-99.

* cited by examiner

METHOD FOR ESTIMATING VARIABLES AFFECTING THE VEHICLE DYNAMICS AND CORRESPONDING VIRTUAL SENSOR

This application is the U.S. national phase of International Application No. PCT/IB2015/055895 filed 3 Aug. 2015, which designated the U.S. and claims priority to IT Patent Application No. TO2014A000631 filed 4 Aug. 2014, the entire contents of each of which are hereby incorporated by reference.

TECHNICAL FIELD

The present description relates to techniques for designing virtual sensors of at least a variable affecting the vehicle dynamics, able to give in real time reliable estimates of the variables of interest using data measured from Electronic Stability Control systems or other devices typically available in production cars and heavy vehicles.

These techniques are in particular directed to estimate the side slip angle of the vehicle and/or the lateral and longitudinal velocity and/or the tire-road friction coefficient. Obtaining in real-time on production vehicles reliable estimates of these variables may allow the design of stability, traction and braking control systems achieving significant performance improvements over the present one.

DESCRIPTION OF THE PRIOR ART

Many methods have been proposed in past years on the technical problem object of the present invention, i.e. the estimation of variables affecting the vehicle dynamics (e.g. the sideslip angle), whose direct measurement requires the use of sensors which are too complex and/or expensive for their use in production vehicles. All these methods are based on a two-step procedure: first, a suitable model of the vehicle (the model including for instance dynamic or kinematic equations with given degree of freedom) is derived; then, a suitable estimation algorithms (which can be based, among others, on the Kalman Filter, or the Sliding Mode Observer, or the Moving Horizon Estimator, or the Particle Filters), is designed on the base of the derived model and implemented on an electronic board for estimating in real-time the variable of interest (e.g. sideslip angle), using the data available from the ESC system or other vehicle devices (e.g. signals pertaining steering angle, wheel velocities, yaw rate, lateral acceleration, . . . ).

These two-step methods suffer from severe drawbacks, which are synthetically described as follows. The estimation algorithms operate on identified models which are only approximate description of the real vehicle dynamic behaviour. Even if a very accurate model could be obtained, finding optimal estimates (e.g. minimal variance) is computationally intractable when the identified model is non-linear, and computationally tractable but necessarily approximate methods are then used. Due to the approximations in the modelling and estimation steps, no methods exist for evaluating how accurate the two-step methods may be. Even the boundedness of estimation error is not easily achieved for complex systems. Even more relevant, the vehicle models are depending on parameters that may change according to different operational conditions (dry or wet road, tyre wear status, car load . . . ) whose real-time values are not detected in normal production vehicles. Due to these problems (model and estimation approximations, variable operational conditions), none of the above discussed methods appears to have reached the capability of designing estimation algorithms for sideslip angle, longitudinal and lateral velocities, tire-road friction coefficient, achieving acceptable estimation accuracies. This is also evidenced by the fact that no estimator of these variables, designed with these methods, has been made available on commercial vehicles.

OBJECT AND SUMMARY

An object of one or more embodiments is to overcome the limitations inherent in the solutions achievable from the prior art.

According to one or more embodiments, that object is achieved thanks to a method for estimating a variable affecting the vehicle dynamics having the characteristics specified in claim 1. One or more embodiments may refer to a corresponding system, to a virtual sensor module, to a vehicle equipped with such a system or virtual sensor module, as well as to a computer-program product that can be loaded into the memory of at least one computer and comprises parts of software code that are able to execute the steps of the method when the product is run on at least one computer. As used herein, reference to such a computer program product is understood as being equivalent to reference to a computer-readable means containing instructions for controlling the processing system in order to co-ordinate implementation of the method according to the embodiments. Reference to "at least one computer" is evidently intended to highlight the possibility of the present embodiments being implemented in modular and/or distributed form. The at least one computer can be for example, at the level of a electronic control board of the vehicle or a so-called Electronic Control Unit (ECU) comprising portions of software code for implementing the aforesaid method.

The claims form an integral part of the technical teaching provided herein in relation to the various embodiments.

According to the solution described herein, the method includes calculating the estimate of the at least a variable by an estimation procedure comprising
taking in account a set of dynamic variables measured during the motion of the vehicle over respective time intervals and
applying on the set of measured dynamic variables at least an optimal nonlinear regression function calculated with respect to the variable to estimate to obtain the estimate of said variable, the optimal non linear regression function being obtained by an offline optimal calculation procedure including:
on the basis of an acquired set of reference data and of the set of dynamic variables measured during the motion of the vehicle, finding, for a desired accuracy level, a regression function giving an estimation error lower or equal than said desired accuracy level in a given set of operative conditions,
said acquired set of reference data being obtained by acquiring in the given set of operative conditions a set of reference data of variables including variables corresponding to the measured dynamic variables of the vehicle and a lateral and a longitudinal velocity of the vehicle.

In various embodiments, the measured variables acquired from a testing vehicle and/or from a vehicle simulator include steering angle, lateral acceleration, four wheel speeds, yaw rate, longitudinal acceleration and the operation of acquiring a set of reference data includes acquiring data relating to said measured variables and to lateral and longitudinal velocities, the latter being obtained from specific sensors operating on a test vehicle and/or from a vehicle simulator.

In various embodiments the set of reference data is acquired by testing on a test vehicle and/or by a simulator of the vehicle.

In various embodiments, the operation of obtaining a non linear regression function includes, given the functions belonging to a class of functions with given fading memory, finding the function in such class which minimizes the maximum over a measuring time interval of the module of the difference of said function, calculated over a vector of data of the measured variables at previous instants of time, with the arc tangent of the ratio of lateral to longitudinal velocity, assigning said found function as non linear regression function to obtain said estimation.

In various embodiments the sideslip angle is calculated as a function of the estimates of the lateral velocity and of the longitudinal velocity, in particular the arc tangent of their ratio, the estimate of longitudinal velocity being obtained as an optimal non linear regression function calculated on the basis of subset of said set of measured variables pertaining to the longitudinal velocity, said subset including data relating to steering angle, four wheel speeds and longitudinal acceleration, the estimate of lateral velocity being obtained as a optimal non linear regression function calculated on a basis of a further subset of the set of measured variables including lateral acceleration and yaw rate, and the estimate of longitudinal velocity previously obtained.

In various embodiments, a sensor for the estimation of at least a variable affecting a vehicle dynamics is implemented on a processing module and configured to calculate the estimate of the at least a variable describing the motion dynamic of a vehicle taking in account said set of dynamic variables measured during the motion of the vehicle and applying to said set of measured dynamic variables at least an optimal non linear regression function to obtain said estimate, said optimal non linear regression function being obtained according to the method of any of the previous embodiments.

In various embodiments, the sensor has a processing module comprised in the Electronic Control Unit or in a electronic control board of the vehicle.

In various embodiments, the sensor receives the set of dynamic variables measured during the motion of the vehicle from a module configured to measure dynamic variables of the vehicle which comprises an ESC (Electronic Stability Control) system.

In various embodiments, the sensor is integrated in a system for the estimation of at least a variable affecting a vehicle dynamics, including said module configured to measure dynamic variables of the vehicle during its motion and said processing module configured to calculate in real time an estimate of the at least a variable affecting a vehicle dynamics on the basis of such measured dynamic variables.

BRIEF DESCRIPTION OF THE DRAWINGS

The embodiments will now be described purely by way of a non-limiting example with reference to the annexed drawings, in which.

DETAILED DESCRIPTION OF EMBODIMENTS

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment", that may be present in various points of the present description, do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

Figure 1:
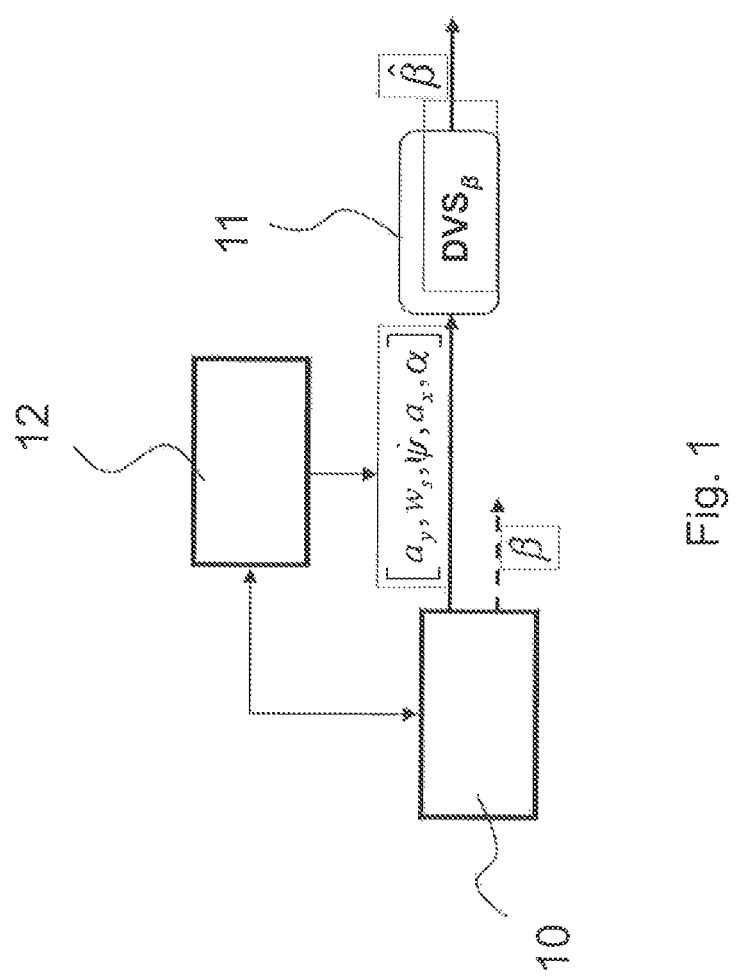
FIG. 1 shows a block diagram of a virtual sensor system implementing online on the vehicle the method according to one embodiment, in order to estimate in real-time the sideslip angle.

In FIG. 1 it is shown a block diagram representing schematically an embodiment of a virtual sensor for the real-time estimation of the sideslip angle of a vehicle.

With the numerical reference 10 is indicated a block representing a vehicle to which is associated a sideslip angle $\beta$ to be measured. An ESC system 12, or another system of the vehicle controlling the stability of the vehicle 10 on the basis of the measurement of the value of variables of the vehicle 10 during its motion, measures, in way known per se, the following measured variables MQ of the vehicle 10, during its motion: steering angle $\alpha$, lateral acceleration $a_y$, four wheel speeds $w_s$, yaw rate $\dot{\psi}$, longitudinal acceleration $a_x$. As mentioned, these are the variables basically measured by an ESC system and the method here described operates on real time preferably on the basis of only such variables measured by the ESC 12. Such variables MQ are fed to a sideslip angle virtual sensor module 11, which, on the basis of such variables supplies in real time an estimate $\hat{\beta}$ of the sideslip angle $\beta$ of the vehicle 10.

Figure 2:
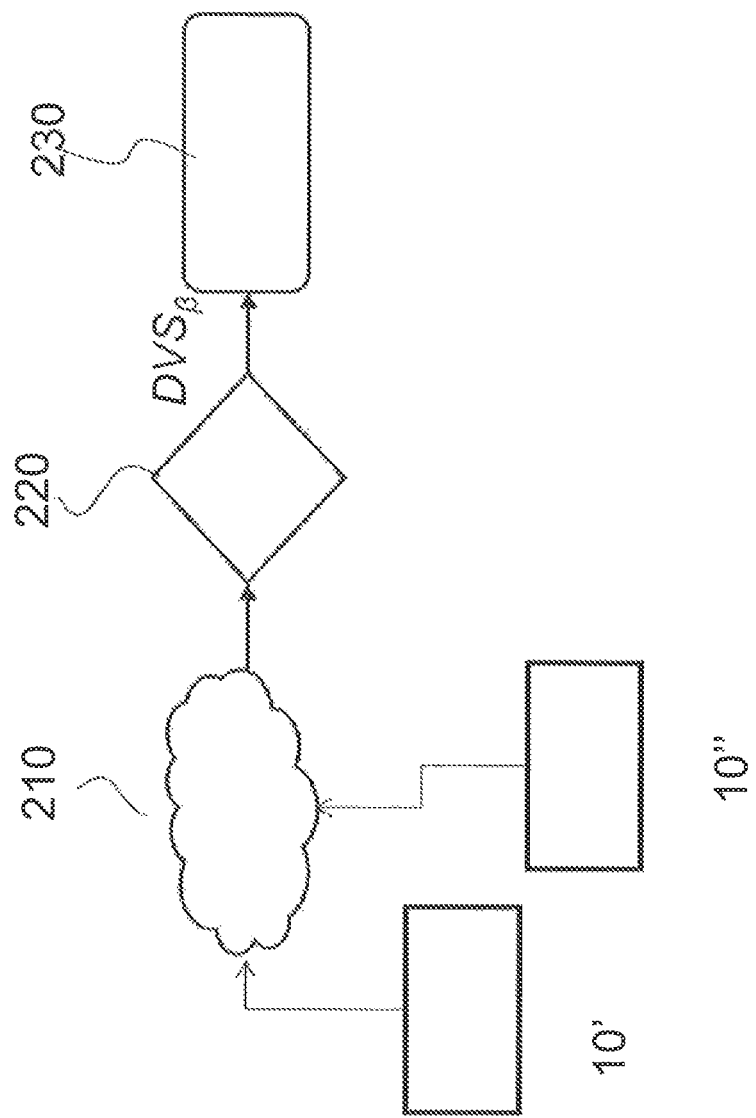
FIG. 2 represents a block diagram of the operations performed off-line by said method in order to design the virtual sensor.

The virtual sensor 11 implements a procedure $DVS_\beta$ for the estimation of a variable affecting the motion of a vehicle, in particular in this case the sideslip angle, which is designed by the method sketched in FIG. 2. The method includes a step 210 of acquiring, by measurement from a test vehicle 10' or by simulation through a vehicle simulator 10" or by measuring part of the data and by simulating other parts of the data, a reference data set $D_d$. As regards as the acquisition by measurement of the reference data, the test vehicle 10' has to be of the same type of the vehicle 10 on which the sensor 11 is implemented.

The reference data set $D_d$ is then passed to a operation 220 of design of the virtual sensor $DVS_\beta$ which in step 230 is then implemented in a software module 11. This module, embedded in an ECU available on vehicle 10, receiving in real time only the signal, pertaining to measured variables MQ, i.e. $[a_y, w_s, \dot{\psi}, \alpha]$, measured by the vehicle Electronic Stability Control 12, supplies in real-time an estimate $\hat{\beta}$ of the sideslip angle $\beta$.

In the embodiment here described the set of reference sampled data $D_d$ is the following:

$$D_d = \{a_y(t), w_s(t), \dot{\psi}(t), a_x(t), \alpha(t), v_x(t), v_y(t) \ t = \Delta t, \ldots, N*\Delta t\} \quad (1)$$

With t is indicated the time instant of the acquisition, varying from $\Delta t$ to $N*\Delta t$, where $\Delta t$ is the sampling time and N is the number of acquired samples. For the sake of notational simplicity in the following a sampling time $\Delta t=1$ is considered. This reference data set $D_d$ may include experimental data typically measured on a testing vehicle, in particular a car or a heavy vehicle, for evaluating the dynamic performances of the vehicle under consideration, in particular data of the variables used by the known two-step methods for building and testing the vehicle model. Such reference data, or part of this reference data, can be however also acquired not by direct measurement, but by simulation: if a reliable simulator of the vehicle is available, the data of the reference data set $D_d$ of equation (1) can be generated by such simulator. In both cases, such data of the reference data set $D_d$ have to be related to driving tests, either executed or simulated, which are performed within given ranges for speed, braking, road-tire friction condition, car load, driving style and other parameters, defining different operational conditions OC of the vehicle 10, which are in particular the operational conditions of interest.

As per equation (1), the reference data set $D_d$ includes acquired reference data [$a_y$, $w_s$, $\dot{\psi}$, $a_x$, $\alpha$], corresponding to the variables MQ measured on the vehicle 10 during the vehicle motion, supplied by the ESC system 12 to the virtual sensor 11, i.e. steering angle $\alpha$, lateral acceleration $a_y$, four wheel speeds $w_s$, yaw rate $\dot{\psi}$, longitudinal acceleration $a_x$. However, the reference data set $D_d$ includes also further acquired reference data pertaining to longitudinal and lateral velocity $v_x$ and $v_y$. These longitudinal and lateral velocity $v_x$ and $v_y$ data can be preferably provided by the vehicle simulator, in order to keep the measuring equipment necessary for the off-line design of virtual sensor 11 to a minimum. However, in case that the reference data set $D_d$ is obtained from measurements on a testing vehicle, these data can be provided by laboratory optical or inertial plus GPS sensors, in a way known per se. The longitudinal and lateral velocity $v_x$ and $v_y$ data are used only in the definition, or design, of the estimation procedure $DVS_\beta$ implemented by the virtual sensor 11 and are not needed for the real time estimation.

It is here described in general a solution for the estimation of a variable affecting the vehicle dynamics. Although the embodiments described in the following are directed mainly to obtain an estimate of sideslip angle, in some of these embodiments the method here described can be exploited to estimate other variables of interest in describing the motion of a vehicle, without necessarily obtaining also the sideslip angle.

The embodiments of the solution here described are in general based on the realization of a virtual sensor $DVS_\beta$ as a discrete-time nonlinear regression equation of the form:

$$\hat{\beta}(t+1) = f_\beta(r_\beta(t))$$

$$r_\beta(t) = a_y(t), \ldots, a_y(t-n_y), w_s(t), \ldots, w_s(t-n_w), \\ \dot{\psi}(t), \ldots, \dot{\psi}(t-n_\psi), a_x(t), \ldots, a_x(t-n_x), \alpha(t), \ldots, \\ \alpha(t-n_\alpha) \quad (2)$$

i.e. given a time t at which the variables MQ are measured, the estimated sideslip angle $\hat{\beta}$ at subsequent time instant t+1 is obtained by the value of a nonlinear regression function $f_\beta$ evaluated at the argument vector $r_\beta(t)$ which is a vector of variables acquired from the ESC system 12 of vehicle 10, measured over respective intervals of time $n_y$, $n_w$, $n_\psi$, $n_x$ and $n_\alpha$ which are given integers. Such intervals of time $n_y$, $n_w$, $n_\psi$, $n_x$ and $n_\alpha$ define the memory of the virtual sensor $DVS_\beta$ and can be set as different one with respect to the other.

The operation 220 of designing the virtual sensor $DVS_\beta$ is obtained by finding a function $f_\beta$ which is solution of the following $\epsilon$-Robust Design Problem: making use of the data contained in the set of reference data $D_d$ and of information on their measurement accuracy, i.e. each measured value is considered with its measurement accuracy or error, find, for a desired accuracy level $\epsilon$, a regression function $f_\beta$ giving an estimation error bounded as $|\beta(t)-\hat{\beta}(t)| \leq \epsilon$, i.e. the module of the difference between the sideslip angle $\beta$ and its estimate $\hat{\beta}$ is lower or equal than a desired accuracy level $\epsilon$ for any time t, for the whole ranges of operational conditions OC of interest (the operation conditions OC can include, among others, road-tire friction, car load, tire status), the test vehicle or simulator undergoing such operational conditions OC to obtain the data set $D_d$, at step 210.

Three embodiment examples are here presented.

In the first embodiment, leading to a virtual sensor indicated as $DVS_\beta$, the offline operation 220 is related to finding a regression function $f^*_\beta$ solution of the following optimization problem:

$$f^*_\beta = \arg \min{}_{f \in \mathcal{F}} \max{}_{t=m,\ldots,T} |\arctan(v_y(t)/v_x(t)) - f(r_\beta(t-1))| \quad (3)$$

where the data contained in the reference data set $D_d$ are used for computing the right end side of (3).

$\mathcal{F}$ is a class of functions with given fading memory defined as:

$$\mathcal{F} \triangleq \left\{ \begin{array}{c} f: |f(r_\beta(t)) - f(\tilde{r}_\beta(t))| \leq \gamma \rho^k \|r_\beta(t-k) - \tilde{r}_\beta(t)\|; \\ \forall t; k = 1, \ldots, m, \forall r_\beta(t), \tilde{r}_\beta(t) \end{array} \right\} \quad (4)$$

i.e. the functions $f$ of class $\mathcal{F}$ respect the Lipschitz condition for each time t. The constant of the Lipschitz condition is a product of parameters $\gamma$, $\rho$ to the k-th power, where $0 \leq \gamma < \infty$, $0 \leq \rho < \infty$, and k varies from 1 to m, where $m = \max[n_y, n_w, n_\psi, n_x, n_\alpha]$, i.e. the maximum interval among the different interval of measurement of the variables MQ.

Recalling that by definition the sideslip angle is $\beta(t)=\arctan(v_y(t)/v_x(t))$ and $\hat{\beta}(t)=f_\beta(r_\beta(t-1))$, see equation (2), it follows that the regression function $f^*_\beta$ solution of (3) is found as the function $f$ in said class $\mathcal{F}$ of fading memory functions which minimizes the maximum estimation error $|\beta(t)-\hat{\beta}(t)|$ for any time instant t and for the whole ranges of operational conditions OC of interest (dry/wet road or road-tire friction coefficient, vehicle load, tyre status, etc.) accounted for in the experimental conditions used to acquire the reference data set $D_d$.

The values of $\rho$ and m in equations (3) and (4) are design parameter of the estimation procedure $DVS_\beta$: the larger are selected, the lower is the estimation error $\epsilon$ that can be achieved, but the larger is the transient response time of the estimate $\hat{\beta}$.

The value of parameter $\gamma$ can be selected operating on the reference data $D_d$ according to step 5b of the procedure described in section D of the paper C. Novara, F. Ruiz, M. Milanese, "Direct Filtering: A New Approach to Optimal Filter Design for Nonlinear Systems", IEEE Trans. on Automatic Control, 58, pp. 89-99, 2013.

In section II.D of the same paper, a method for solving the optimization problem (3) is described.

Finally, let $\varepsilon^*$ be computed as:

$$\varepsilon = \max_{t=m,\ldots,T} |\arc \tan(v_y(t)/v_x(t)) - f^*_\beta(r_\beta(t-1))| \quad (5)$$

where the data contained in the reference data set $D_d$ are used for computing the right end side of (5).

The errors of the estimation procedure $DVS_\beta$ described by the function $f^*_\beta$ are bounded as $|\beta(t) - \hat{\beta}^*(t)| \leq \varepsilon^*$ for all times $t$ and the whole ranges of operational conditions OC included in the data set $D_d$. Then, if $\varepsilon^* \leq \varepsilon$, the derived virtual sensor $DVS_\beta$ is a solution to the $\varepsilon$-Robust Design Problem.

All the computation from (3) to (5) are performed by offline operation 220, using the data contained in the reference data set $D_d$.

The virtual sensor implementing this embodiment in real-time on the vehicle, represented by 11 in FIG. 1, computes at current time $t$ the estimate $\beta^*(t)$ of the sisdeslip angle $\beta(t)$ as follows:

$$\beta^*(t) = f^*_\beta(r_\beta(t-1)) = \quad (6)$$

$$= f^*_\beta \begin{pmatrix} a_y(t-1), \ldots, a_y(t-n_y-1), w_s(t-1), \ldots, \\ w_s(t-n_w-1), \dot{\psi}(t-n_\psi-1), a_x(t-1), \ldots, \\ a_x(t-n_x-1), \alpha(t-1), \ldots, \alpha(t-n_\alpha-1) \end{pmatrix}$$

where the values of $a_y$, $w_s$, $a_x$, $\dot{\psi}$, $\alpha$ at the required times are acquired from the ESC module 12 and $f^*_\beta$ is the regression function computed offline as solution of (3).

Thus, the first embodiment regards a method for the estimation of at least a variable, which is in the embodiment the sideslip angle $\beta$, affecting the vehicle 10 dynamics, including measuring variables MQ, of the vehicle 10 during its motion, calculating in real time an estimate $\beta^*$ of said variable represented by the sideslip angle $\beta$ on the basis of such measured variables MQ, performing the step 230 of calculating the estimate of the sideslip angle $\beta$ by an estimation procedure, $DVS_\beta$, comprising taking in account a set of variables MQ, i.e. the vector $r_\beta(t)$ of variables acquired from the ESC system 12, measured during the motion of the vehicle 10 over respective time intervals $n_y$, $n_w$, $n_\psi$, $n_x$, $n_\alpha$ and applying on such set of measured variables an optimal non linear regression function $f^*_\beta$ calculated with respect to such sideslip angle $\beta$ to obtain such estimation, said optimal non linear regression function $f^*_\beta$ being obtained by an offline optimal calculation procedure, i.e. operation 220, including: on the basis of an acquired set of reference data $D_d$, finding, for a desired accuracy level $\varepsilon$, a regression function $f_\beta$ giving an estimation error lower or equal than said desired accuracy level $\varepsilon$ in a given set of operative conditions OC, the acquired set of reference data $D_d$ being obtained by an operation 210 of acquiring in said given set of operative conditions OC a set of reference data $D_d$ of variables including variables corresponding to said measured variables MQ of the vehicle 10 and a lateral velocity $v_y$ and a longitudinal velocity $v_x$ of the vehicle 10.

A second embodiment, leading to a virtual sensor of the vehicle sideslip angle, indicated as $DVS_{\beta v}$, is based on the design of two virtual sensors of the longitudinal velocity $v_x$ and lateral velocity $v_y$, indicated as $DVS_{vx}$ and $DVS_{vy}$, respectively.

These two virtual sensors are designed by the offline operation 220, making use of reference data $D_d$ as follows:

The virtual sensor $DVS_{vx}$ is obtained of the form:

$$v^*_x(t) = f^*_x(r_x(t-1))$$

$$r_x(t-1) = w_s(t-1), \ldots, w_s(t-n_w-1), a_x(t-1), \ldots,$$
$$a_x(t-n_x-1), \alpha(t-1), \ldots, \alpha(t-n_\alpha-1) \quad (7)$$

$r_x$ is a vector composed by a subset of the measured variables MQ, i.e. the four wheels speed w, longitudinal acceleration $a_x$, and steering angle $\alpha$. In various embodiments other choices for the subset composing vector $r_x$ are possible.

$f^*_x$: is the solution of the optimization problem:

$$f^*_x = \arg \min {}^n{}_{f \in \mathcal{F}} \max_{t=m,\ldots,T} |v_x(t) - f(r_x(t-1))| \quad (8)$$

where the data contained in the reference data set $D_d$ are used for computing the right end side of (8).

The $f^*_x$ solution of the above optimization problem gives estimates $v^*_x(t)$ of longitudinal velocity $v_x(t)$ which minimize the maximum estimation error $|v_x(t) - v^*_x(t)|$ for any $t$ and for the whole ranges of operational conditions OC of interest (dry/wet road, vehicle load, tyre status, etc.) accounted for in the experimental conditions used to acquire the reference data set $D_d$.

The virtual sensor $DVS_{vy}$ is obtained of the form:

$$v^*_y(t) = f^*_y(r_y(t-1))$$

$$r_y(t-1) = a_y(t-1), \ldots, a_y(t-n_y-1), \dot{\psi}(t-1), \ldots,$$
$$\dot{\psi}(t-n_\psi-1), v^*_x(t-1), \ldots, v^*_x(t-n_x-1) \quad (9)$$

$r_y$ is a vector composed by a subset of the measured variables MQ, i.e. the lateral acceleration $a_y$, yaw rate $\dot{\psi}$, with the addition of the estimate of the longitudinal velocity $v^*_x$ obtained from (7) and (8). In various embodiments other choices for the subset composing vector $r_y$ are possible.

$f^*_y$ is the solution of the optimization problem:

$$f^*_y = \arg \min {}^n{}_{f \in \mathcal{F}} \max_{t=m,\ldots,T} |v_y(t) - f(r_y(t-1))| \quad (10)$$

where the data contained in the reference data set $D_d$ are used for computing the right end side of (10).

The $f^*_y$ solution of the above optimization problem gives estimates $v^*_y(t)$ of longitudinal velocity $v_y(t)$ which minimize the maximum estimation error $|v_y(t) - v^*_y(t)|$ for any $t$ and for the whole ranges of operational conditions OC of interest (dry/wet road, tyre status, etc.) accounted for in the experimental conditions used to acquire the reference data set $D_d$.

The estimate $\beta^*_v$ of the sideslip angle $\beta$ provided the virtual sensor $DVS_{\beta v}$ designed according this second embodiment is defined as:

$$\beta^*_v(t) = \arc \tan(v^*_y(t)/v^*_x(t))$$

i.e. as the arc tangent of the ratio of the optimal estimate $v^*_y$ for the lateral velocity $v_y$ over the optimal estimate $v^*_x$ of the longitudinal velocity $v_x$.

the quantity $\varepsilon^*_2$ is computed as:

$$\varepsilon^*_2 = \max_{t=m,\ldots,T} |\arc \tan(v_y(t)/v_x(t)) - \arc \tan(v^*_y(t)/v^*_x(t))| \quad (11)$$

where the data contained in the reference data set $D_d$ are used for computing the right end side of (11).

This quantity provides a bound on the estimation errors of the virtual sensor $DVS_{\beta v}$ designed according this second embodiment, i.e. $|\beta(t) - \beta^*_v(t)| \leq \varepsilon^*$ for all times $t$ and the whole ranges of operational conditions OC included in the data set $D_d$. Then, if $\varepsilon^* \leq \varepsilon$, the derived estimation procedure $DVS_{\beta v}$ is a solution to the $\varepsilon$-Robust Design Problem. The $f^*_x$ and $f^*_x$ solutions of the optimization problems (8) and (10) can be obtained by using the algorithm described in the previously cited Novara-Ruiz-Milanese paper.

All computations from (7) to (11) are performed by offline operation 220, using the data contained in the reference data set $D_d$ as described above.

The virtual sensor $DVS_{\beta v}$ implementing this embodiment in real-time on the vehicle, represented by 11 in FIG. 1, computes at current time t the estimate $\beta^*(t)$ of the sideslip angle $\beta(t)$ performing the following operations:

the estimate $v^*_x(t)$ of the longitudinal velocity $v_x(t)$ at current time t is computed as:

$$v^*_x(t) = f^*_x(w_s(t-1), \ldots, w_s(t-n_w-1), a_x(t-1), \ldots, a_x(t-n_x-1), \alpha(t-1), \ldots, \alpha(t-n_\alpha-1)) \quad (12)$$

where the values of $w_s$, $a_x$, $\alpha$ at the required times are acquired online from the ESC module 12 and $f^*_x$ is the regression function computed offline as solution of (8).

the estimate $v^*_y(t)$ of the lateral velocity $v_x(t)$ at current time t is computed as:

$$v^*_y(t) = f^*_y(a_y(t-1), \ldots, a_y(t-n_y-1), \dot{\psi}(t-1), \ldots, \dot{\psi}(t-n_\psi-1), v^*_x(t-1), \ldots, v^*_x(t-n_x-1)) \quad (13)$$

where the values of $a_y$, $\dot{\psi}$ at the required times are acquired online from the ESC module 12, the values of $v^*_x$ at the required times are the optimal estimates of the longitudinal velocities computed online from (12), and $f^*_y$ is the regression function computed offline as solution of (10).

the estimate $\beta^*_v(t)$ of the sideslip angle $\beta(t)$ at current time t provided by the virtual sensor $DVS_{\beta v}$ is computed as:

$$\beta^*_v(t) = \arctan(v^*_y(t)/v^*_x(t)) \quad (14)$$

where $v^*_y(t)$ and $v^*_x(t)$ are the optimal estimates previously computed via (12) and (13).

This second embodiment, in addition to give a virtual sensor $DVS_{\beta v}$ of sideslip angle $\beta$ that may be more accurate than given by the first embodiment virtual sensor $DVS_\beta$, provides also the virtual sensors $DVS_{vx}$ and $DVS_{vy}$, giving estimates of vehicle longitudinal and lateral velocities, respectively. Note that obtaining reliable estimates of these variables represents a relevant technical aspect per se, being the knowledge of $v_x(t)$ and $v_y(t)$ of great value for optimizing traction and braking control systems, collision avoidance systems, etc.

Since the computation of (12) and (13) giving the estimates of lateral velocity $v^*_y(t)$ and longitudinal velocity $v^*_x(t)$ occur before the calculation of equation (14) estimating the sideslip angle $\hat{\beta}^*_v$, it is possible by the second embodiment here described to design virtual sensors $DVS_{vx}$ and $DVS_{vy}$ estimating only lateral velocity and/or longitudinal velocity, without necessarily estimating also the sideslip angle.

A third embodiment of the method, leading to the design of a virtual sensor of sideslip angle indicated as $DVS_{\beta\mu}$, envisage, at step 210, to operate a partition of the reference data set $D_d$ in a number L of reference subsets $D_{d1}$, $D_{d2}, \ldots, D_{dL}$. Each one of said subsets identified by a determined operational condition of interest in said given set of operation conditions OC, contains data acquired for a same value (or values range) of such operational condition of interest. In the embodiment here described it is considered that the partition is performed according to the road-tire friction coefficients $\mu_1, \mu_2, \ldots, \mu_L$, which can be considered as the most relevant operational condition OC affecting vehicle dynamics. For the sake of exposition simplicity, partition in L=2 subsets is considered, but the method can be easily extended to larger values of L, as shown below. Assuming that in the reference data set $D_d$ the data for t= 1, ..., M are acquired with friction coefficient $\mu \cong \mu 1$, and for t=M+1, ..., N are acquired with $\mu \cong \mu 2$, the two reference subsets are:

$$D_{d1} = \{a_y(t), w_s(t), \dot{\psi}(t), a_x(t), \alpha(t), v_x(t), v_y(t) t=1, \ldots, M\}$$

$$D_{d2} = \{a_y(t), w_s(t), \dot{\psi}(t), a_x(t), \alpha(t), v_x(t), v_y(t) t= M+1, \ldots, N\} \quad (15)$$

After such partition step, in the offline operation 220 the following estimators are evaluated, by finding functions which are solution of a $\epsilon$-Robust Design Problem, i.e.:

a first estimators of the sideslip angle is evaluated of the form:

$$\beta^*_1(t+1) = f^*_{\beta 1}(r_\beta(t))$$

where $r_\beta(t)$ is given in equation (2) and $f^*_{\beta 1}$ is the solution of the following optimization problem:

$$f^*_{\beta 1} = \arg\min{}_{f \in \mathcal{F}} \max{}_{t=m, \ldots, T} |\arctan(v_y(t)/v_x(t)) - f(r_\beta(t-1))| \quad (16)$$

where the data contained in the first reference data set $D_{d1}$ are used for computing the right end side of (16).

a second estimator of the sideslip angle is evaluated of the form:

$$\beta^*_2(t+1) = f^*_{\beta 2}(r_\beta(t))$$

where $f^*_{\beta 2}$ is the solution of the following optimization problem:

$$f^*_{\beta 2} = \arg\min{}_{f \in \mathcal{F}} \max{}_{t=M+1+m, \ldots, N} |\arctan(v_y(t)/v_x(t)) - f(r_\beta(t-1))| \quad (17)$$

where the data contained in the second reference data set $D_{d2}$ are used for computing the right end side of (17).

it is evaluated by the operation 220 a first estimator of the yaw rate of the form:

$$\dot{\psi}^*_1(t+1) = f^*_{\dot\psi 1}(r_{\dot\psi}(t))$$

where $r_{\dot\psi}(t) = w_s(t), \ldots, w_s(t-n_w), a_y(t), \ldots, a_y(t-n_y), \alpha(t), \ldots, \alpha(t-n_\alpha)$, is a vector composed by a subset of the measured variables MQ, i.e. the four wheels speed $w_s$, lateral acceleration $a_y$, and steering angle $\alpha$ and $f^*_{\dot\psi 1}$ is the solution of the optimization problem:

$$f^*_{\dot\psi 1} = \arg\min{}_{f \in \mathcal{F}} \max{}_{t=m, \ldots, M} |\dot\psi(t) - f(r_{\dot\psi}(t-1))| \quad (18)$$

where the data contained in the first reference data set $D_{d1}$ are used for computing the right end side of (18).

a second estimator of the yaw rate is evaluated of the form:

$$\dot{\psi}^*_2(t+1) = f^*_{\dot\psi 2}(r_{\dot\psi}(t))$$

where $f^*_{\dot\psi 2}$ is the solution of the following optimization problem:

$$f^*_{\dot\psi 2} = \arg\min{}_{f \in \mathcal{F}} \max{}_{t=M+1+m, \ldots, N} |\dot\psi(t) - f(r_{\dot\psi}(t-1))| \quad (19)$$

where the data contained in the second reference data set $D_{d2}$ are used for computing the right end side of (19).

All computations from (16) to (19) are performed by offline operation 220, using the data contained in the reference data sets $D_{d1}$ and $D_{d2}$ as described above. The $f^*$ solutions of the optimization problems (16), (17), (18), (19) can be obtained by using the algorithm described in the previously cited Novara-Ruiz-Milanese paper.

The virtual sensor implementing this embodiment in real-time on the vehicle, represented by 11 in FIG. 1, performs at current time t the following operations.

two estimates $\dot\psi^*_1(t)$ and $\dot\psi^*_2(t)$ of the yaw rate $\dot\psi(t)$ at current time t are computed as:

$$\dot\psi^*_1(t) = f^*_{\dot\psi 1}(r_{\dot\psi}(t-1)) \quad (20)$$
$$= f^*_{\dot\psi 1}\begin{pmatrix} w_s(t-1), \ldots, w_s(t-n_w-1), a_y(t-1), \ldots, \\ a_y(t-n_y-1), \alpha(t-1), \ldots, \alpha(t-n_\alpha-1) \end{pmatrix}$$

$$\dot\psi^*_2(t) = f^*_{\dot\psi 2}(r_{\dot\psi}(t-1)) = \quad (21)$$
$$= f^*_{\dot\psi 2}\begin{pmatrix} w_s(t-1), \ldots, w_s(t-n_w-1), a_y(t-1), \ldots, \\ a_y(t-n_y-1), \alpha(t-1), \ldots, \alpha(t-n_\alpha-1) \end{pmatrix}$$

where the values of $w_s$, $a_y$, $\alpha$ at the required times are acquired from the ESC module 12 and $f^*_{\dot\psi 1}$ and $f^*_{\dot\psi 2}$ are the regression functions computed offline in (18) and (19), corresponding to consider that the actual operating condition is $\mu=\mu_1$ or $\mu=\mu_2$, respectively.

A solution $\lambda^*$ of the following optimization problem is computed:

$$\lambda^*(t)=\arg\min{}_{0\leq\lambda\leq1}|\dot\psi(t)-\lambda\dot\psi^*_1(t)-(1-\lambda)\dot\psi^*_2(t)| \quad (22)$$

i.e. given the absolute value of the difference between the yaw rate $\dot\psi(t)$ at current time t, measured in real-time at the ESC module 12, and a linear combination of the first yaw rate estimate $\dot\psi^*_1(t)$ and second yaw rate estimate $\dot\psi^*_2(t)$ having coefficients function of a parameter $\lambda$, finding the value of the parameter $\lambda$, comprised among 0 and 1, minimizing such difference. This optimization problem can be efficiently solved online using known linear search methods.

two estimates $\beta^*_1(t)$ and $\beta^*_2(t)$ of the sideslip anal $\beta(t)$ at the current time t are computed as:

$$\beta_1^*(t) = f_{\beta1}^*(r_\beta(t-1)) = \qquad (23)$$
$$= f_{\beta1}^* \begin{pmatrix} a_y(t-1),\ldots,a_y(t-n_y-1),w_s(t-1),\ldots, \\ w_s(t-n_w-1),\dot\psi(t-1),\ldots,\dot\psi(t-n_\psi-1), \\ a_x(t-1),\ldots,a_x(t-n_x-1),\alpha(t-1),\ldots,\alpha(t-n_\alpha-1) \end{pmatrix}$$

$$\beta_2^*(t) = f_{\beta2}^*(r_\beta(t-1)) = \qquad (24)$$
$$= f_{\beta2}^* \begin{pmatrix} a_y(t-1),\ldots,a_y(t-n_y-1),w_s(t-1),\ldots, \\ w_s(t-n_w-1),\dot\psi(t-1),\ldots,\dot\psi(t-n_\psi-1), \\ a_x(t-1),\ldots,a_x(t-n_x-1),\alpha(t-1),\ldots,\alpha(t-n_\alpha-1) \end{pmatrix}$$

where the values of $a_y$, $w_s$, $a_x$, $\dot\psi$, $\alpha$ at the required times are acquired from the ESC module 12 and $f^*_{\beta1}$, and $f^*_{\beta2}$ are the regression functions computed offline in (16) and (17), corresponding to consider that the actual operating condition is $\mu=\mu_1$ or $\mu=\mu_2$, respectively.

Finally the estimate $\beta^*_\mu(t)$ of the sideslip angle $\beta(t)$ at current time t is computed as:

$$\beta^*_\mu(t)=\lambda^*(t)\beta^*_1(t)-(1-\lambda^*(t))\beta^*_2(t) \quad (25)$$

i.e. as a linear combination of the first and second estimate of the sideslip angle having as coefficient functions of the optimal parameter $\lambda^*$, namely the optimal parameter $\lambda^*$ and the negative value of its complement to one.

Thus the third embodiment just described obtains the estimate $\beta^*_\mu$ of the sideslip angle $\beta$, through the estimation of the yaw rate. The rationale of this embodiment is as follows.

Equations (20) and (21) define two virtual sensors which give estimates in real-time of the yaw rate.

However, the yaw rate needs not to be estimated, since it is actually measured in real-time by the ESC system 12. The yaw rate estimates are indeed exploited to detect in real-time the value of the tire-road friction coefficient $\mu$, making use of the optimal parameter $\lambda^*$, obtained as solution of the optimization problem (22) by comparing the two yaw rate estimates with the value actually measured by the ESC system 12.

If the vehicle 10 is operating, for example, on a road with actual friction coefficient $\mu_1$, then the first yaw rate estimate $\dot\psi^*_1(t)$, being $f^*_{\dot\psi1}$ designed from data measured in conditions of same friction coefficient $\mu_1$, see (18), gives more accurate estimates than the second yaw rate estimate $\dot\psi^*_2(t)$, being $f^*_{\dot\psi2}$ designed for a friction coefficient $\mu_2$, see (19), different from the actual one. Consequently, the solution of optimization problem (22) leads to $\lambda^*=1$, thus detecting that actually the vehicle 10 is operating with friction coefficient $\mu_1$. Then, from equation (25), the sideslip estimate $\beta^*_\mu(t)=\beta^*_1(t)$ is provided. As can be seen from equations (16) and (25), the estimate $\beta^*_1(t)$ of the sideslip angle is obtained by the virtual sensor described by regression function $f^*_{\beta1}$ that minimizes the estimation error for the operational condition $\mu_1$. Thus, this estimate, which exploits the partition of the reference data according to the $\mu$ values, achieves better (or at most equal) accuracy than achievable from the virtual sensor $DVS_\beta$ of the first embodiment and the virtual sensor $DVS_{\beta v}$ of the second embodiment which, not detecting in real-time the value of the tire-road friction coefficient, need to balance their estimation performances for the range of p values the data set $D_d$ account for.

Besides the above discussed estimation accuracy improvement over virtual sensors $DVS_\beta$ and $DVS_{\beta v}$, a further interesting feature of this third virtual sensor $DVS_{\beta\mu}$ is that this third embodiment allows to obtain a virtual sensor, indicated as $DVS_\mu$, providing in real-time an estimate $\mu^*(t)$ of the tire-road friction coefficient $\mu(t)$ at current time t, computed as follows:

$$\mu^*(t)=\lambda^*(t)\mu_1(t)-(1-\lambda^*(t))\mu_2(t) \quad (26)$$

The estimation in real-time of the tire-road friction coefficient represents a relevant technical aspect per se. This information is indeed of relevant value for many vehicle dynamics problems, e.g. traction and braking control, vehicle dynamic control, collision avoidance, etc., but at present it is not made available on normal production vehicles. The design of the virtual sensor $DVS_\mu$ for estimating only the tire-road friction coefficient requires the offline solutions only of optimization problems (18) and (19) and the online execution only of operations (20), (21), (22) and (26)).

As mentioned, the operations just described for partition in L=2 subsets, can be easily extended to larger values of the number L of reference subsets. In the offline operation 220 L functions $f^*_{\beta1},\ldots,f^*_{\beta L}$ and L $f^*_{\dot\psi1},\ldots,f^*_{\dot\psi L}$ are computed from L equations similar to equations (16), (17) and (18), (19), each one based on the corresponding reference subsets $D_{d1}, D_{d2},\ldots, D_{dL}$. The virtual sensor 11 operating in real-time on the vehicle, at the current time t, computes L estimates $\dot\psi^*_1(t),\ldots,\dot\psi^*_L(t)$ of the yaw rate $\dot\psi(t)$, obtained by L equations similar to equations (20), (21) and L estimates $\beta^*_1(t),\ldots,\beta^*_L(t)$ of the sideslip angle $\beta(t)$, obtained by L equations similar to equations (23), (24). The yaw rate estimates are used in a vectorial version of equation (22) to determine the value of a vector $\Lambda^*$ of positive coefficients having sum one, minimizing the difference between the yaw rate $\dot\psi(t)$, and a linear combination of such estimates $\dot\psi^*_1(t),\ldots,\dot\psi^*_L(t)$, having as coefficients the components of said vector $\Lambda^*$. Finally the sideslip angle is obtained using a vectorial version of equation (25), i.e. a linear combination of sideslip estimates $\beta^*_1(t),\ldots,\beta^*_L(t)$, having as coefficients the components of said vector $\Lambda^*$.

The current embodiment has been illustrated with reference to the yaw rate as specific example of a variable ($\dot\psi$) whose value is measured in real time on the vehicle (10) and depends on a condition of interest, e.g the road-friction coefficient $\mu$, to be estimated.

It is clear however that the operations described with reference to the third embodiments can more in general used for detecting the real time value of an operational condition of interest OC on the basis of said vector $\Lambda^*$ of coefficients, partitioning the reference data set $D_d$ in a plurality L of reference subsets $D_{d1}, D_{d2},\ldots, D_{dL}$ according to the value of an operational condition of interest in the given set of operation conditions OC, obtaining a plurality of estimate, corresponding to said reference subsets ($D_{d1}, D_{d2}, \ldots, D_{dL}$), of a variable affecting the vehicle dynamics, whose value is measured in real-time on the vehicle 10 and depends on said condition of interest OC, by said operation 220 of obtaining an optimal non linear regression function;

obtaining the vector $\Lambda^*$ of coefficients solution of an optimization problem minimizing the difference between the measured variable and a linear combination of such estimates of the variable affecting the vehicle dynamics having the coefficients determined by said vector of coefficients.

The solution according to the various embodiments here described allows to obtain the following advantages.

The method and virtual sensors according to the various embodiments here described allows to obtain the real-time estimation of the variables of interest which, at difference from the methods of prior art, allows implementation in normal production vehicles. In particular, the method is computationally tractable, and it allows to guarantee the estimation accuracy that can be achieved in different operational conditions a production vehicle has to operate (e.g. road-tire friction coefficient, load, tyre status), whose real-time values are not detected in production vehicles.

Of course, without prejudice to the principle of the embodiments, the details of construction and the embodiments may vary widely with respect to what has been described and illustrated herein purely by way of example, without thereby departing from the scope of the present embodiments, as defined the ensuing claims.

Although the solution is described with reference to variables measured by an ESC system, the solution can be implemented using also other measurements available in real time on the vehicle.

The solution described and claimed here are developed with particular attention to the estimation of vehicle sideslip angle, longitudinal and lateral velocities, tire-road friction coefficients, which are relevant variables for automotive safety systems related to monitoring and control of vehicle stability, steering, traction and braking. Reference to these particular variables is not, however, to be understood as in any way limiting the embodiments, which are in themselves applicable also to other vehicle dynamic variables, e.g. vertical and roll variables, relevant for suspension control systems; variables relevant in fields different from the automotive one, e.g. attitude estimation in aerospace and marine vehicles.

The invention claimed is:

1. A method for virtual detection of at least a variable affecting a vehicle dynamics, comprising using a computer and performing an estimation of said at least a variable affecting a vehicle dynamics, said method including:
measuring dynamic variables of the vehicle during its motion,
calculating in real time an estimate of said variable, on the basis of said measured dynamic variables,
wherein
calculating said estimate of said at least a variable by an estimation procedure comprises taking into account said set of dynamic variables measured during the motion of the vehicle over respective time intervals and applying onto said set of measured dynamic variables at least an optimal nonlinear regression function, calculated with respect to said variable to estimate, to obtain said estimate of said variable,
said optimal non linear regression function being obtained by an optimal calculation procedure including:
on the basis of an acquired set of reference data and of said set of dynamic variables measured during the motion of the vehicle, finding, for a desired accuracy level, a regression function giving an estimation error lower than or equal to said desired accuracy level in a given set of operative conditions, used to obtain said acquired set of reference data, said set of operative conditions including operation conditions whose real-time values are not measured in the vehicle,
said acquired set of reference data being obtained by acquiring in said given set of operative conditions a set of reference data of variables including variables corresponding to said measured dynamic variables of the vehicle, and a lateral and a longitudinal velocity of the vehicle, and
wherein said method includes
partitioning the reference data set in plurality of reference subsets according to the value of an operational condition of interest in said given set of operation conditions,
obtaining a plurality of estimate, corresponding to said reference subsets, of a variable affecting the vehicle dynamics which value is also measured in real time on the vehicle and which values depend on said condition of interest, by said operation of obtaining an optimal non linear regression function,
obtaining a vector of coefficients solution of an optimization problem minimizing the difference between the measured variable and a linear combination of such estimate of the variable affecting the vehicle dynamics having the coefficients determined by said vector of coefficients.

2. The method according to claim 1, wherein said measured dynamic variables include steering angle, lateral acceleration, four wheel speeds, yaw rate, and longitudinal acceleration and said operation of acquiring in said given set of operative conditions a set of reference data includes acquiring data relating to said measured dynamic variables and to lateral and a longitudinal velocity.

3. The method according to claim 1, wherein acquiring said set of reference data by testing on a test vehicle and/or by a simulator of said vehicle.

4. The method according to claim 1, wherein said operation of obtaining an optimal non linear regression function includes the steps of:
given the functions belonging to a class of functions with given fading memory, finding the function in said class which minimizes the maximum estimation error with respect to said variable for any time instant t and for the whole given set of operative conditions, and
assigning said function found at the previous step as optimal non linear regression function to obtain said estimate of the variable affecting the vehicle dynamics.

5. The method according claim 1, wherein said at least a variable affecting a vehicle dynamics which is estimated is a sideslip angle.

6. The method according to claim 1, wherein said at least a variable affecting a vehicle dynamics which is estimated includes the lateral velocity and the longitudinal velocity,
an estimate of longitudinal velocity being obtained as an optimal non linear regression function calculated by said optimal calculation on the basis of a subset of said set of measured dynamic variables pertaining to the longitudinal velocity, said subset including data relating to steering angle, four wheel speeds and longitudinal acceleration, an estimate of lateral velocity being obtained as an optimal non linear regression function calculated by said optimal calculation on the basis of a further subset of said set of measured dynamic variables including lateral acceleration and yaw rate, and said estimate of longitudinal velocity.

7. The method according to claim 1, including calculating an estimate of a sideslip angle as a function of an estimate of the lateral velocity and an estimate of the longitudinal velocity.

8. The method according to claim 1, wherein said method includes detecting the real time value of said operational condition of interest on the basis of said vector of coefficients.

9. The method according to claim 8, wherein said operation condition is a road tire friction coefficient.

10. The method according to claim 1, wherein said method includes obtaining estimate of the sideslip angle corresponding to said reference subsets by said operation of obtaining an optimal non linear regression function;
calculating the estimate of the sideslip angle as a linear combination of said sideslip angle estimate of said linear parameter.

11. A virtual sensor for the estimation of at least a variable affecting a vehicle dynamics, implemented on a processing module and configured to calculate said estimate of at least a variables describing the motion dynamic of a vehicle taking into account said set of dynamic variables measured during the motion of the vehicle and applying to said set of measured dynamic variables at least an optimal non linear regression function to obtain said estimate, said optimal non linear regression function being obtained according to the method of claim 1.

12. The sensor according to claim 11, wherein said processing module is comprised in an Electronic Control Unit or in an electronic control board of the vehicle.

13. The sensor according to claim 11, wherein said sensor receives said set of dynamic variables measured during the motion of the vehicle from a module configured to measure dynamic variables of the vehicle which comprises an ESC system.

14. The sensor according to claim 11 wherein the sensor is integrated in a system for the estimation of at least a variable affecting a vehicle dynamics, said system including
a module configured to measure dynamic variables of the vehicle during its motion;
and said processing module configured to calculate in real time an estimate of the at least a variable affecting a vehicle dynamics on the basis of said measured dynamic variables.

15. The vehicle, comprising the virtual sensor according to claim 11.

16. A computer program product that can be loaded into the memory of at least one computer and comprises parts of software code that are able to execute the steps of the method of claim 1 when the product is run on the at least one computer.

* * * * *